United States Patent [19]

Covell, III

[11] Patent Number: 4,852,215
[45] Date of Patent: Aug. 1, 1989

[54] POULTRY SCALDING SYSTEM AND PROCESS

[76] Inventor: Edward H. Covell, III, 919 Riverside Dr., Salisbury, Md. 21801

[21] Appl. No.: 315,841

[22] Filed: Feb. 27, 1989

[51] Int. Cl.⁴ ............................................. A22C 21/04
[52] U.S. Cl. ........................................... 17/11.2; 17/51
[58] Field of Search .................... 17/11.2, 51, 1 E, 11, 17/44.1, 47

[56] References Cited

U.S. PATENT DOCUMENTS

| | | | |
|---|---|---|---|
| 2,667,661 | 2/1954 | Long | 17/11.2 |
| 2,879,540 | 3/1959 | Van Ness | 17/11.2 |
| 3,474,490 | 10/1969 | Groover et al. | 17/1 E |
| 3,564,645 | 2/1971 | Brugman | 17/1 E |
| 3,828,397 | 8/1974 | Harben, Jr. | 17/1 E |

Primary Examiner—Willis Little
Attorney, Agent, or Firm—Watson, Cole, Grindle & Watson

[57] ABSTRACT

A process and system of immersion poultry scalding employs counterflow recirculation of scald liquid in a counterdirection to that of the travel of the poultry through the immersion tank. The liquid removed from the tank is filtered and cleaned, sanitized as it is superheated and heats make-up water added to the system to scald temperature before it is returned to the immersion tank. A head trough may be provided for immersing the heads only of the poultry before entering the main part of the immersion tank, and a head trough heat exchanger is provided in the system for heating up the potable make-up water before being supplied to the head trough.

15 Claims, 4 Drawing Sheets

POULTRY SCALDING SYSTEM AND PROCESS

BACKGROUND OF THE INVENTION

This invention relates generally to a poultry immersion scalding system and process in which poultry is conveyed in an open immersion tank containing scalding liquid as the conveyor moves the poultry while hanging by the legs. More particularly, the poultry is conveyed in one direction through the tank, and the scalding liquid is emptied from the tank and returned to flow in a direction opposite the poultry conveying direction, the liquid thus recirculated being filtered and additional liquid being added and heated before being returned to the immersion tank.

For a typical start-up operation of immersion scalders, the immersion tank is filled with clean water and heated to the desired scald temperature. The water can be heated by live steam injection, by steam passing through heat exchange plates in the immersion tank or by hot air and steam injection into the scald water. During operation approximately one quart of clean tap water is added for every bird moving through the immersion tank. The make-up water is usually at ground temperature, i.e., 65° F. to 70° F. The birds pass through the scald (immersion) tank for 8-16 hours per day. Counting work breaks the water can be 18 hours old when the last bird exits the scalder.

The fresh make-up water of about one quart per bird helps maintain the water level in the immersion tank as the birds carry water out in their feathers. Also, the U.S.D.A. normally requires an overflow of water from the scald tank. This provides some dilution of the contaminated water but has very little effect. The cold add water is sometimes added to the tank at a concentrated location, but is normally added through a perforated pipe extending along the scalder for dissapating the cold make-up water so as not to create cold spots in the tank which could defeat the purpose of the scalder.

The flow of water in a scalder allows water to be mixed during conveyance of the poultry along adjacent conveyor runs as the birds travel in opposite directions relative to one another. The flow of water is not directed in a controlled path nor in any purposeful direction.

The typical immersion scalder presents considerable cross-contamination problems. A bird having very little bacteria will pick up bacteria in the water from birds that have passed before it. In many cases bacteria types may be introduced into the bird that it does not have until it is immersed in the scalder.

As well known, a scalder is utilized as part of a poultry processing operation so as to heat the skin of the bird to loosen the feathers allowing the feathers to be plucked at a station after the birds leave the scald tank. The bird's feathers act as insulation preventing heat from reaching the skin.

In immersion scalding the birds are carried by an overhead conveyor hanging by the feet and are immersed in a hot bath of water. The water is heated and agitated by air injection in the bottom of the scalder or by pumps moving large volumes of water that flow over the birds. During the scalding Process the skin and feathers are heated by the heat transfer of hot water (124° to 142° F.) into the bird.

Non-immersion scalders are also known which utilize live steam injection for heating the skin of the bird to loosen the feathers for subsequent plucking. However, since the scalder tank is open significant steam blow-by from the top of the scalder is experienced with such live steam injection scalders. This steam reaches the surface of the scald water before it completely dissipates into the water.

Factors that contribute to scalding are temperature and time. For a hard scald, higher water temperature could mean less time in the scalder for the heat transfer required to loosen the feathers. This is limited, however, because at temperatures as high as 142° F. the bird may cook. For this reason it is not possible for scald water to be heated sufficiently high to kill many types of bacteria.

Also it takes more time to soft scald the bird than it does for a hard scald. Soft scald is used when the preferred end product is a yellow bird. The outer layer of skin which carries the yellow color is easily overheated and will if overheated be removed from the bird in the pickers along with the feathers. For this reason the temperature is lower than hard scald, although bacteria of many types cannot be killed by the low temperature of the water.

Other factors contributing to temperature and time are bird health, rigor mortis, the Ph of the water, the poultry breed, the weather, the type Of immersion scalder, the picking system, the type of kill cut and bleed time.

The soft scald temperature of broiler chickens is about 124° to 130° F., with an average of 127° to 128° F. The hard scald temperature of broiler chickens is between about 130° to 140° F. Turkeys are always hard scalded at a temperature between 137° to 140° F. And, the make-up water for immersion scalders usually amounts to one quart per bird for chickens and one half gallon per bird for turkeys.

SUMMARY OF THE INVENTION

It is therefore an object of the present invention to provide an improved poultry immersion scalding system and Process which avoids the problems experienced with known immersion scalders. In accordance with the invention cross-contamination of the birds is substantially avoided, and the scald water is cleaner as it is filtered and sanitized during recirculation. The system can operate continuously in water which is even cleaner after recirculation. The recirculated water is heated using less energy and less make-up water than before.

By screening and filtering the recirculated water a substantial amount of coarse material such as sand and wood chips are removed from the water. In the past with more of these particles in the water the birds were recontaminated as the water passed through the feathers. After the scalding operation the pickers would beat bacteria from these particles into the skin of the birds.

By sanitizing the water surface bacteria on the skin will also be lower and there will be less of such bacteria for the picking machines to beat into the bird.

Although the U.S.D.A. requires that an overflow be maintained at the scalder, with the filtering and sanitizing system of the invention less make-up water will be required for the scalder. This translates into less energy used to heat water. And with less tap water used there is a saving of the cost of water in and out of the plant.

The present system will add heat in a sanitize tank and in a water mixing tank. This heat will be added by heat exchange plates or by steam injection. These tanks are closed vessels to thereby eliminate any steam blow-by.

In accordance with the invention, the flow of water in the scalder tank is counter to the direction the birds are conveyed through the tank. The sanitized water enters the scalder at an exit location of the birds. The contaminated water will exit the scalder at the entrance location of the birds. As each bird travels through the scalder it will be moving into cleaner water all the time The water removed from the tank at the entrance end at which the birds are conveyed into the tank is sanitized as it Passes in heat exchange relationship with superheated water from a sanitize tank. The heating liquid from the heat exchanger is then combined with fresh make-up water in a mixing tank for yielding sanitized recirculating liquid at a predetermined scald temperature before it is returned to the tank at the exit end of the bird conveyor.

The immersion tank may have a shallow water containing head trough at the entrance end of the bird conveyor into which only the heads of the birds are immersed before being more fully immersed in the tank. The make-up water will flow in heat exchange relationship with the sanitized water and will be thereby heated before flowing to the head trough.

Other objects, advantages and novel features of the invention will become more apparent from the following detailed description of the invention.

DETAILED DESCRIPTION OF THE INVENTION

Figure 1:
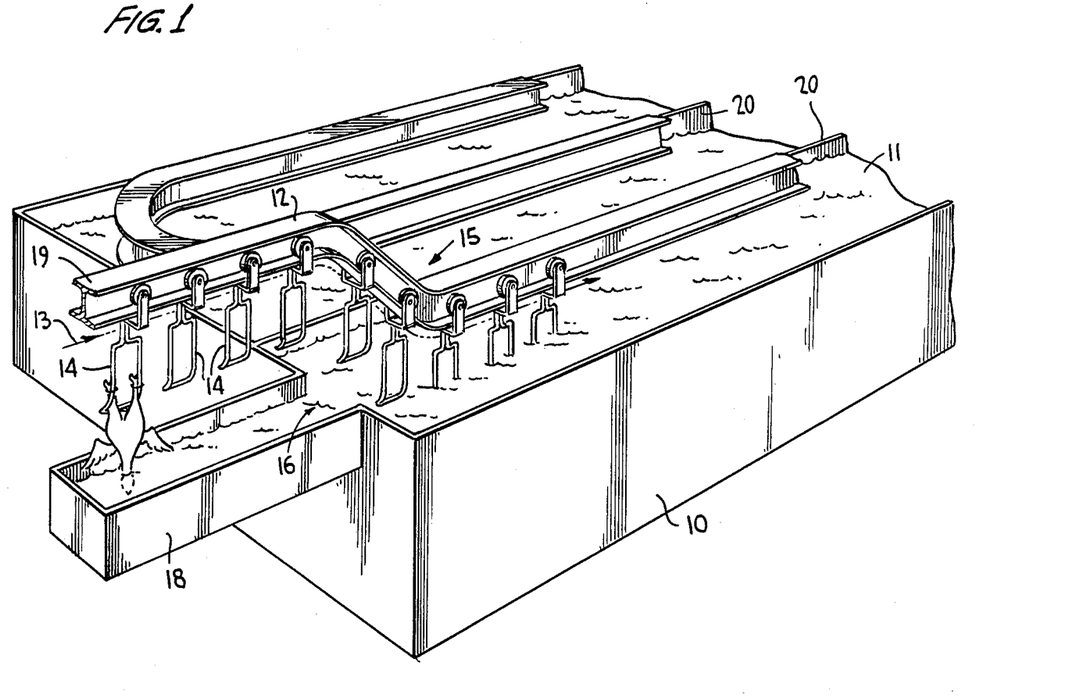
FIG. 1 is a prospective view of part of the immersion tank having a head trough according to the invention.

Turning now to the drawings wherein like reference characters refer to like and corresponding parts throughout the several views, a partial view of an immersion tank 10 is shown in FIG. 1 containing scalding liquid 11 at a predetermined scald temperature. A conveyor 12 which may have several runs back-and-forth is positioned above the tank for moving poultry in one direction through the tank shown by arrows 13 shown in FIGS. 1 and 4 to 6. The conveyor is of known construction having movable shanks 14 suspended therefrom to which the legs of the birds are secured in some manner such that the birds are fully immersed in the liquid 11 When dipping downwardly into the liquid at the end of bend 15 of the conveyor. The conveyor moves the birds from an entrance station 16 at the tank to an exit station 17 (FIG. 4) at the tank in the direction of arrows 13.

The scalder tank has a relatively shallow head trough 18 at entrance station 16, the trough containing fresh water slightly heated above ground water temperature and supplied in a manner to be described more fully hereinafter. The conveyor has an elevated section 19 for suspending the birds such that the heads only of the birds are immersed in the fresh head trough water. Thus, if the bird is still breathing at this stage of the poultry processing operation it will inhale relatively clean water into its lungs and air sacs. The bird will therefore draw in water having a much lower bacteria count than when immersed in prior systems.

Figure 2:
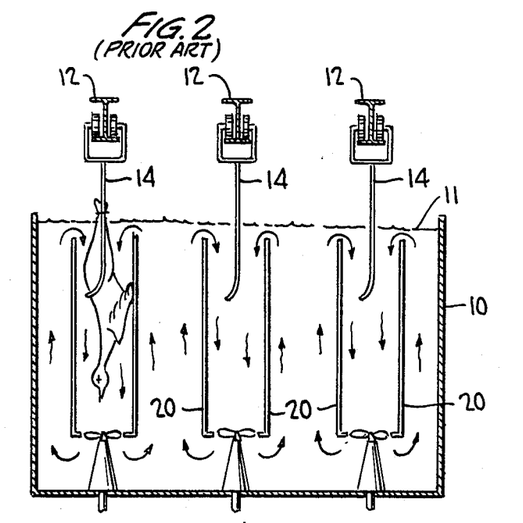
FIGS. 2 and 3 are vertical sectional views of two types of known poultry immersion scalding tanks.
Figure 3:
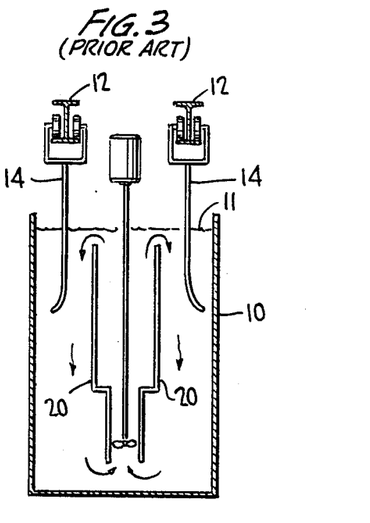
Figure 4:
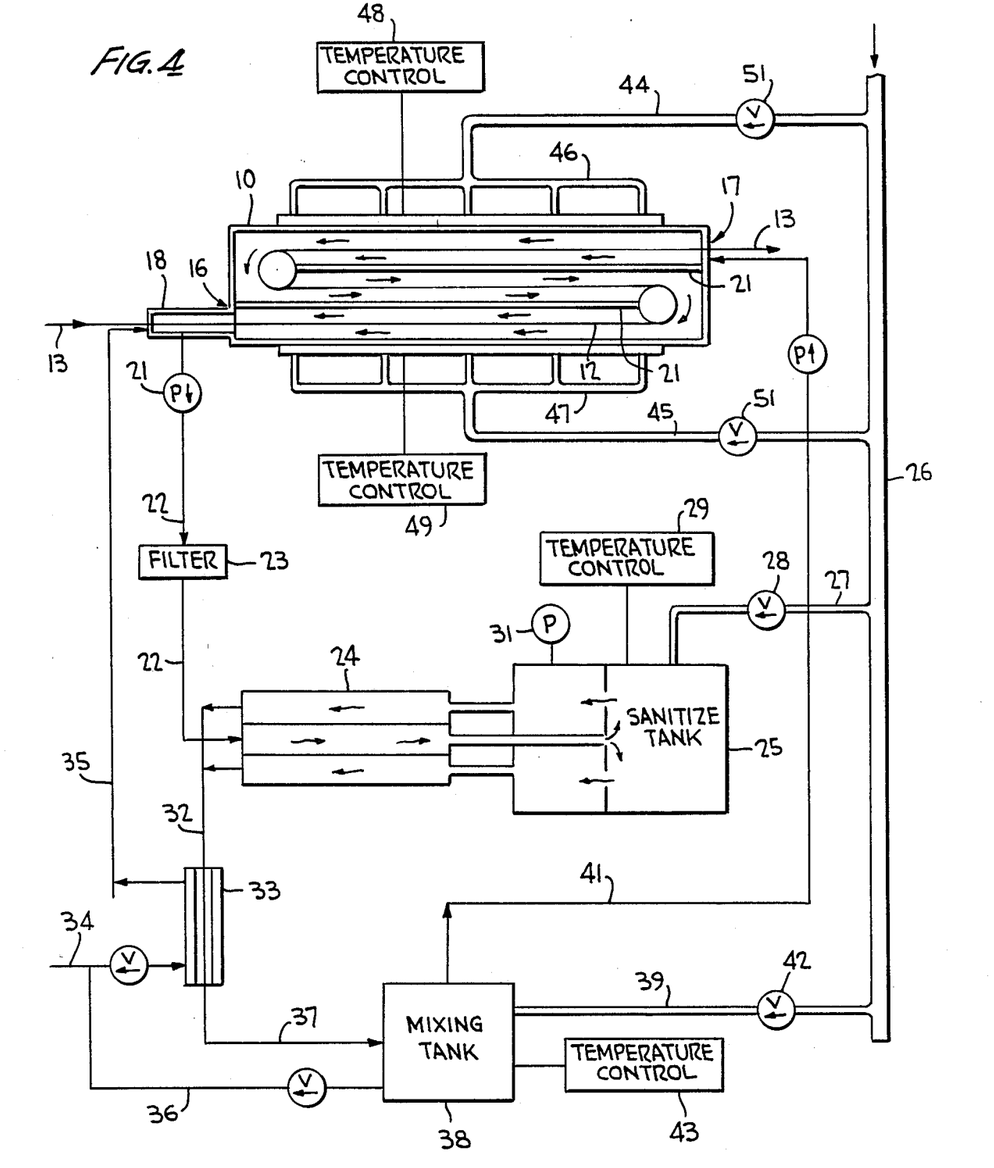
FIGS. 4, 5 and 6 are schematic views of various embodiments of the system according to the invention.

The scalder tank is constructed to direct the flow of water downwardly onto the birds being conveyed through the tank as in the manner shown in FIGS. 2 or 3 illustrating two different types of immersion scalders. Most scalders have agitators with props at the tank bottom to move the water in a direction of the arrows shown in these two Figures. Some scalders also utilize pumps to move air into the bottom of the scalder to submerge the bird. FIG. 2 illustrates a 3-pass conveyor and FIG. 3 shows a 2-pass conveyor, although more conveyor passes may be provided when desired. And, although entrance and exit stations 16 and 17 are shown in FIG. 4 located at opposite ends of immersion tank 10, it should be pointed out that the entrance and exit stations may be located at the same end of the tank depending on the number of conveyor passes through the tank. Moreover, as is well known, the conveyor passes are separated by partition walls 20 which allow water from different conveyor passes to be intermixed. Thus, while the birds are moved in opposite directions relative to one another while traveling along adjacent passes, they are cross-contaminated with bacteria remaining in the scald water in those immersion scalders not employing the system of the invention.

In accordance with the counter flow principle of the invention, the bacteria contaminated water will be removed at entrance station 16 of the scalder at the location at which the birds enter the scalder during operation of the conveyor. Removal may be effected by a pump 20 or by gravity, and will flow via conduit 22 through a screening and filtering station 23 at which wood chips, sand and other particles removed from the birds while in the scalder will be filtered and screened from the removed scald water. The filtering will help maintain the heat exchangers used in the present system clean and operating at the highest efficiency. And, by filtering these particles from the removed scald water it will be assured that a reduced amount of such particles will cling to the birds before exiting the scalder. Thus, the pickers will not beat as much of this foreign material into the skin of the birds during the subsequent poultry processing operation.

The filtered liquid through conduit 22 flows through a heat exchanger 24 and into a superheated water tank or sanitize tank 25. Tank 25 is a closed vessel containing a quantity of water which is superheated to about 175° F. using, for example live steam injection via a steam conduit 26 having a branch line 27 connected through suitable valving 28 to tank 25. A suitable temperature control unit 29 on tank 25 may be set for operating valve 28 to maintain the temperature of the superheated water in tank 25 to a desired level.

The filtered liquid from conduit 22 is typically at the same scald temperature of 128° F. as that in immersion tank 10. This filtered liquid flows through heat exchanger 24, into tank 25, mixes with the liquid in the sanitize tank and the mixed liquid flows at or near the superheat temperature in the direction of the arrows out of tank 25 and through heat exchanger 24. This heat exchanger is constructed in any normal manner having a plurality of heat exchange plates effecting heat exchange between the oppositely directed flow of liquid therein, such that the filtered liquid increases in temperature as the superheated water decreases in temperature during this heat exchange, and the liquid at the exit end of the heat exchanger flows into conduit 32 at a predetermined temperature of about 133° F., for example, which can be maintained by the heat exchanger and the control temperature in the sanitize tank.

The sanitize tank functions to kill the bacteria in the filtered water entering the tank as BTU's are added to the tank 25 water via conduits 26, 27 elevating the temperature therein to about 175° F. The superheated recirculated water will then exit through heat exchanger 24 passing off heat to the incoming filtered water such that this completes the loop of the bacteria killing segment of the Present system.

The still very warm heating liquid in conduit 32 then passes through another heat exchanger 33 provided for head trough 18. Potable ground water, typically at a temperature of about 65° F., is supplied from a source (not shown) through conduit 34 to heat exchanger 33 and exits through conduit 35 after passing in heat exchange relationship with the heating liquid flowing from conduit 32 through heat exchanger 33. The heat exchanger 33 is constructed so as to elevate the temperature of the ground water to about 90° F. after passing therethrough in heat exchange relationship with the heating liquid. The liquid in conduit 35 flows into the shallow head trough 18 as fresh water which will overflow into the main portion of the immersion tank. This fresh water will be part of the fresh potable ground water required to be added to the immersion tank for replenishing any loss of liquid from the tank as carried out by the birds and for maintaining scalder tank overflow if desired. The heads only of the birds are immersed in the head trough containing clean water, as illustrated in FIG. 1. Thus, should the birds still be breathing at this stage of the poultry processing operation they will inhale relatively clean water into their lungs and air sacs. The birds will therefore draw in water at a much lower bacteria count compared to prior immersion scalding systems.

Head trough heat exchanger 33 may be located in the external liquid recirculating system shown in FIG. 4 either upstream or downstream of the sanitize tank 25 depending on the desires of the plant. And, it should be pointed out that some plant operations may not require or desire a head trough, in which case the head trough and its heat exchanger may be eliminated from the system without departing from the invention.

The potable ground water used as make-up water for the system likewise flows through a branch conduit 36 into a mixing tank 36, and the heating liquid exiting heat exchanger 33 flows through a conduit 37 into a tank 38 where it is mixed (pooled) with the 65° F. potable water. Tank 38 is a closed vessel and the temperature of the mixed liquid therein is maintained at the desired level via steam injection, or the like, as through a branch conduit 39 passing through a suitable valve 42. The temperature in tank 30 is maintained at the desired level by a control 43 which may regulate valve 42. The mixture of heating liquid and potable water in tank 38 is heated to the scald temperature, which may be 128° F., so that the liquid exiting the tank 38 through conduit 41 is returned to immersion tank 10 at exit station 17 for recirculating scald liquid at the scald temperature through tank 10 in a direction opposite the direction of travel of the birds being conveyed through tank 10. The sanitized recirculating liquid being returned to the immersion tank through conduit 41 is substantially free of bacteria and includes make-up water which is heated partially by the heating liquid flowing through conduit 37 and supplemented by steam injection via branch conduit 39, so that cleaner water is recirculated through the immersion tank with the present system at a rate which may, for example be about to equal the liquid volume of the immersion tank liquid in 30 minutes.

Live steam may also be injected into the immersion tank via branch conduits 44 and 45 and via manifold branches 46 and 47 to assure maintenance of liquid 11 in tank 10 at the desired scald temperature. Temperature control units 48 and 49 may be provided for sensing and regulating the temperature of liquid 11 in combination with valves 51.

The energy requirements to heat the make-up water and the BTU's provided to the aforedescribed system by the superheat operation for the counterflow immersion scalding system of the invention, will now be set forth.

A Low Boy style scalder, typically shown in FIG. 3, will be used in the following chicken scalding example as it is the most commonly used and is designed to contain the least amount of water.

The U.S.D.A. normally requires an overflow discharge at the scalder during operation. For this purpose, one quart of water per bird is usually added to the scalder. The bird removes about one pint clinging to its feathers as it exits the immersion tank thus leaving about one pint per bird for the overflow discharge. However, this one pint per bird is such a low volume that it would have little effect on the operation even during counterflow movement at a restricted rate of flow without the application of the present system.

It will be shown that a much greater rate of flow of liquid can be superheated and returned to the immersion tank than is now added at the rate of one quart per bird. This is capable of being achieved with only half the add water presently being used. No overflow discharge would therefore be required.

In the following example there is an established goal of recirculating a volume of water per minute equal to the volume of the immersion tank water in a thirty minute period. Other factors are that the recirculated water is superheated in tank 25 to 175° F. while using a heat exchanger 24 structured to reduce the temperature of the superheated water through heat exchange such that the filtered water flowing through heat exchanger 24 is raised to a temperature 5° F. higher when it exits the heat exchanger as sanitized heating liquid.

As other parameters involved in the example, the line speed of the conveyor moving the poultry through the immersion scalder is 140 birds per minute. The scalder (immersion tank), of the Low Boy type, is of a size allowing a conveyor pass of 140 feet therethrough, the birds being mounted on the conveyor at 6 inch centers thus equalling two minutes of scald time for each bird. The volume of the scalder is 3500 gallons of water, and the temperature of the potable ground water added is 65° F. The scald temperature of the immersion tank liquid is 128° F., and the recirculated water leaving the superheat operation through conduit 32 is 133° F. As will be shown, the rate of the recirculated volume of scald water equal to the volume of the scalder in a thirty minute period of time is 116 gallons per minute.

If one quart of potable water per bird is added to the system via conduit 34 the make-up water is added at rate of 35 gallons per minute (one quart per bird × 140 bpm).

To determine the maximum flow of recirculated sanitized water (through conduit 41) the number of BTU's required to heat up the make-up water must be determined. 35 gpm must be heated at mixing tank 36 from 65° F. to 128° F. With the weight of water at 8.345 lb./gal., the following equation applies: (35 gpm) (8.345 lb./gal.) (128° F.−65° F.)=18,400.7 BTU's per minute. This is the amount of heat energy required to heat all the make-up water.

The recirculated water leaves heat exchanger 24 at 133° F. The desired temperature at mixing tank 38 is 128° F. Each gallon of recirculated water at 133° F. will have 5° F. of heat that can be used to heat the make-up water. To determine the maximum recirculated and sanitized rate of flow, the following equation applies: 18,400.7 BTU per minute divided by (8.345 lb./gal.) (133° F.−128° F.)=441 gpm.

441 gallons per minute of recirculated and sanitized water at 133° F. will provide all the heat necessary to heat the make-up water.

If an overflow discharge is not required, and assuming that only one pint of make-up water per bird is added to maintain the water level of the scalder, the flow rate of the make-up water is 17.5 gpm which, when applying the above equation, yields about 220 gpm of recirculated water at 133° F. to provide all the heat necessary to add to the make-up water.

For a 3500 gallon capacity immersion tank at a flow rate of 220 gallons per minute, the present system is capable of recirculating a volume of water equal to the capacity of the scalder in 15.9 minutes using a make-up water add rate of one pint per bird. And, this has been accomplished with half the normal rate of make-up water. The actual system may be designed to recirculate a volume of water that would be at least equal to the 3500 gallons of water of tank 10 capacity in a 30 minute period which is a rate of 116 gallons per minute.

The foregoing example does not take into consideration the head trough or the head trough heat exchanger 33, such that the potable water added to the system is supplied only through conduit 35 into the mixing tank.

When the head trough and its heat exchanger 33 are incorporated into the system, the heat exchange taking place in heat exchanger 33 is used to heat up the potable gound water fed via conduit 35 to head trough 18. Assuming the addition of one pint of water per bird to the system (17.5 gpm) as a total amount of water added to maintain the scalder full of water at 140 bpm, and as-suming a rate of 3 gallons per minute of make-up water to the head trough via conduit 35, 14.5 gpm (17.5−3 gpm) of make-up water is added to mixing tank 38 via conduit 36. The potable water supplied to the head trough at 3 gpm will be heated from 65° F. to 90° F. which is less than the scald temperature of 128° F. since immersion of only the poultry heads in the head trough for the purpose intended does not require scalding. This heat is transferred from the recirculated water or heating liquid exiting heat exchanger 24 through conduit 32 and flowing through heat exchanger 33 in heat exchange relationship with the potable ground water likewise flowing therethrough.

To determine the maximum flow of recirculated sanitized water exiting heat exchanger 24 the amount of BTU's required to heat up the make-up water must be determined. 14.5 gpm must be heated at mixing tank 38 from 65° F. to 128° F. The head trough water must be heated from 65° F. to 90° F. at 3 gpm. Thus, (14.5 gpm) (8.345 lb./gal.) (128° F.−65° F.)=7,623 BTU per minute. And, (3 gpm) (8.345 lb./gal.) (90° F.−65° F.) =626 BTU per minute, for a total of 8,249 BTU per minute to heat up all the make-up water.

The recirculated water in conduit 32 which exits heat exchanger 24 is at a temperature of 133° F. Since the desired temperature at mixing tank 38 is 128° F., each gallon of recirculated water at 133° F. will have 5° F. of heat that can be used to heat the make-up water supplied to the mixing tank. To figure the maximum recirculated flow with 8,249 BTU per minute to heat all the make-up water, 8,249 BTU divided by (8.345 lb./gal.) (133° F.−128° F.)=197.7 gpm. of recirculated water (heating liquid) at 133° F. will provide all the heat necessary to heat the make-up water. The recirculated volume, however, need not be this high. BTU's will be added to the mixing tank via steam injection through branch conduit 39 to provide the heat to elevate the temperature in the mixing tank to 128° F. Thus, to meet the goal of complete recirculated tank 10 volume in 30 minutes only 116 gpm needs to be recirculated. Thus, the system may be designed to recirculate approximately 140 gpm given the aforedescribed parameters.

Figure 5:
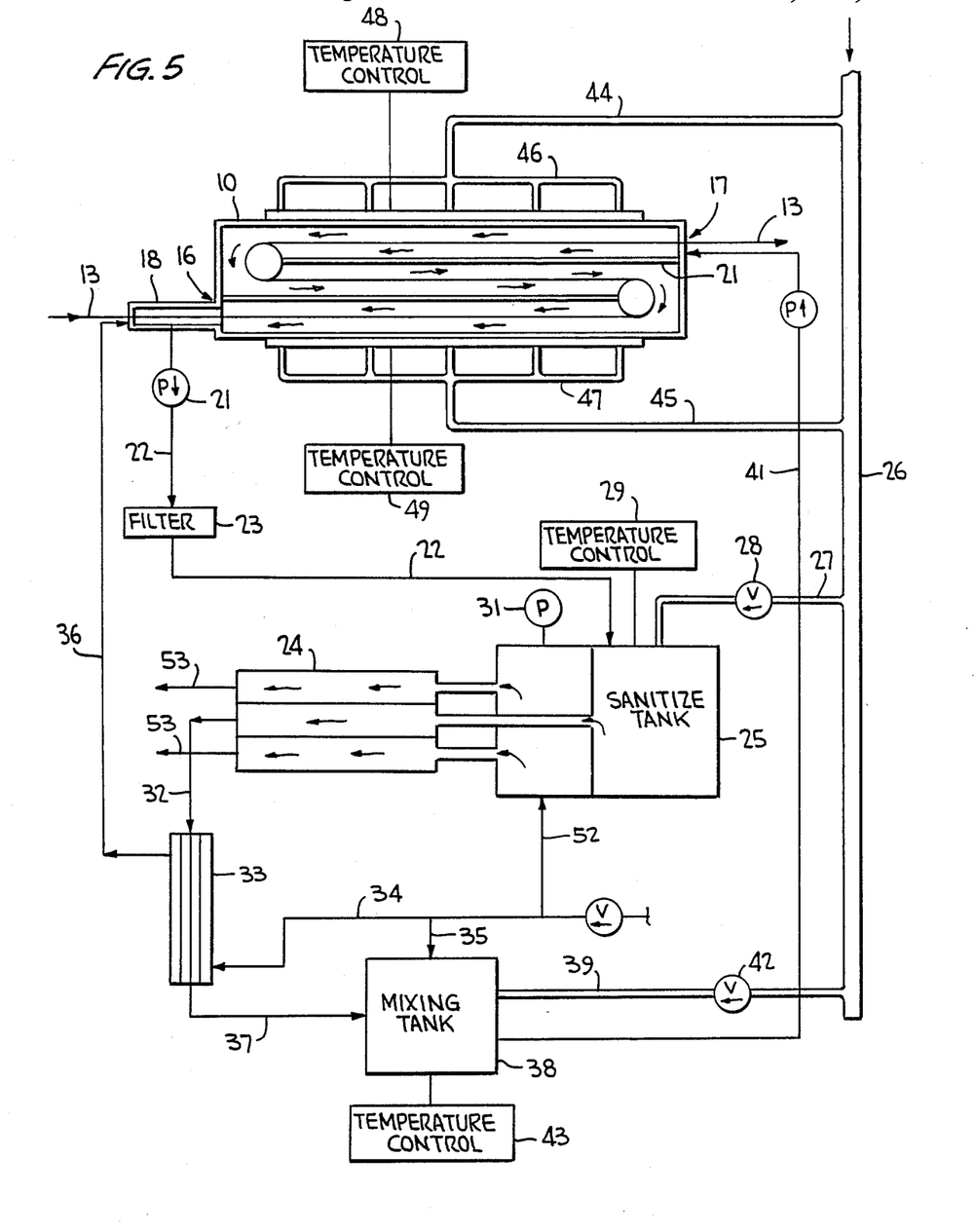

Another embodiment of the present system is set forth in FIG. 5 in which like elements are identified by like reference numerals used in FIG. 4. The same counterflow principle applies as described for FIG. 4 and the filtered water removed from the immersion tank is sanitized in sanitize tank 25, except that heat exchange takes place between the potable ground water and the sanitized, superheated liquid in heat exchanger 24, with the heated potable water being delivered to the picking station, hand wash stations, or other stations in the plant via lines 53. Thus, the system according to FIG. 5 is useful in those situations where warmed potable water is desired for other plant operations, although the system has its limitations since the BTU loss from the system into the warmed potable water is not recoverable. However, if the plant has a need for warm potable water the BTU exchanged may not add to the cost operation of the plant as the water needs to be heated from some other source in any event.

The filtered scald water removed from the tank flows via conduit 22 into sanitize tank 25 where it is superheated to 175° F. as described above. However, potable ground water at 65° F. is supplied via conduit 52 for flow through heat exchanger 24 in heat exchange relationship with the superheated liquid flowing therethrough from the sanitize tank. The potable water is thus warmed up and exits at 53 from the heat exchanger for supplying other designated stations throughout the plant. The potable water is heated from 65° F. to 90° F. in the process of heat exchange thereby reducing the superheated water temperature exiting at 32. If the temperature and flow rate are sufficiently high the liquid from the heat exchanger (line 32) will be directed to flow through head trough heat exchanger 33 for warming up the potable ground water flowing therethrough from line 34 such that the warmed fresh water through conduit 36 supplies the head trough. On the other hand, if the temperature of the liquid at 32 is at scald temperature it may be returned directly to the immersion tank, or may bypass heat exchanger 33 and flow into mixing tank 38. If the temperature of the liquid at 32 is less than or greater than scald temperature it will be directed to the mixing tank such that the potable make-up water and the liquid through conduit 37 are mixed and brought up to scald temperature.

If the liquid from 32 is returned directly to the scalder bypassing the mixing tank then only preheated potable make-up water will be heated in the mixing tank. All water heated in the mixing tank will be pumped to the exit station of the scalder and will flow counter to the direction of the travel of the poultry through the scalder reaching the entrance station of the scalder where it will be removed thereby completing the counterflow loop.

In heat exchanger 24 the potable water is heated from 65° F. to 90° F. in the process of heat exchange from the superheated liquid. The BTU's required to heat the ground water from 65° F. to 128° F. at 17.5 gpm is 9200 BTU per minuted as calculated hereinabove. To meet the recirculated volume requirement of 30 minutes 116 gpm is recirculated. At the sanitize tank the liquid is heated to 175° F. and is cooled in the heat exchanger after it exits at 32. The BTU's available in the superheated liquid at 175° F. available for the system to maintain the liquid at 128° F. scald temperature is 45,497 BTU per minute, i.e., 116 gpm×8.345 lb./gal.×(175° F.−128° F.). Subtracting the 9200 BTU per minute needed to heat the make-up water leaves 36,297 BTU per minute to be removed in the heat exchanger before the recirculated water reaches the mixing tank.

The BTUs required to heat one gallon of water from 65° F. to 90° F. is 208.62 BTU per gallon, i.e., 8.345 lb./gal.×(90° F.−65° F.).

Required to be determined is the amount of potable water to be warmed to cool the superheated recirculated water, in heat exchange relationship in exchanger 24, so that when it is mixed with the make-up water the: combined temperature will not exceed the 128° F. scald temperature.

Since 36,297 BTU per minute is required to be removed in the heat exchanger for 208.62 BTU per gallon of potable water, 174 gallons per minute of potable water will pass through the heat exchanger to cool the superheated liquid.

Figure 6:
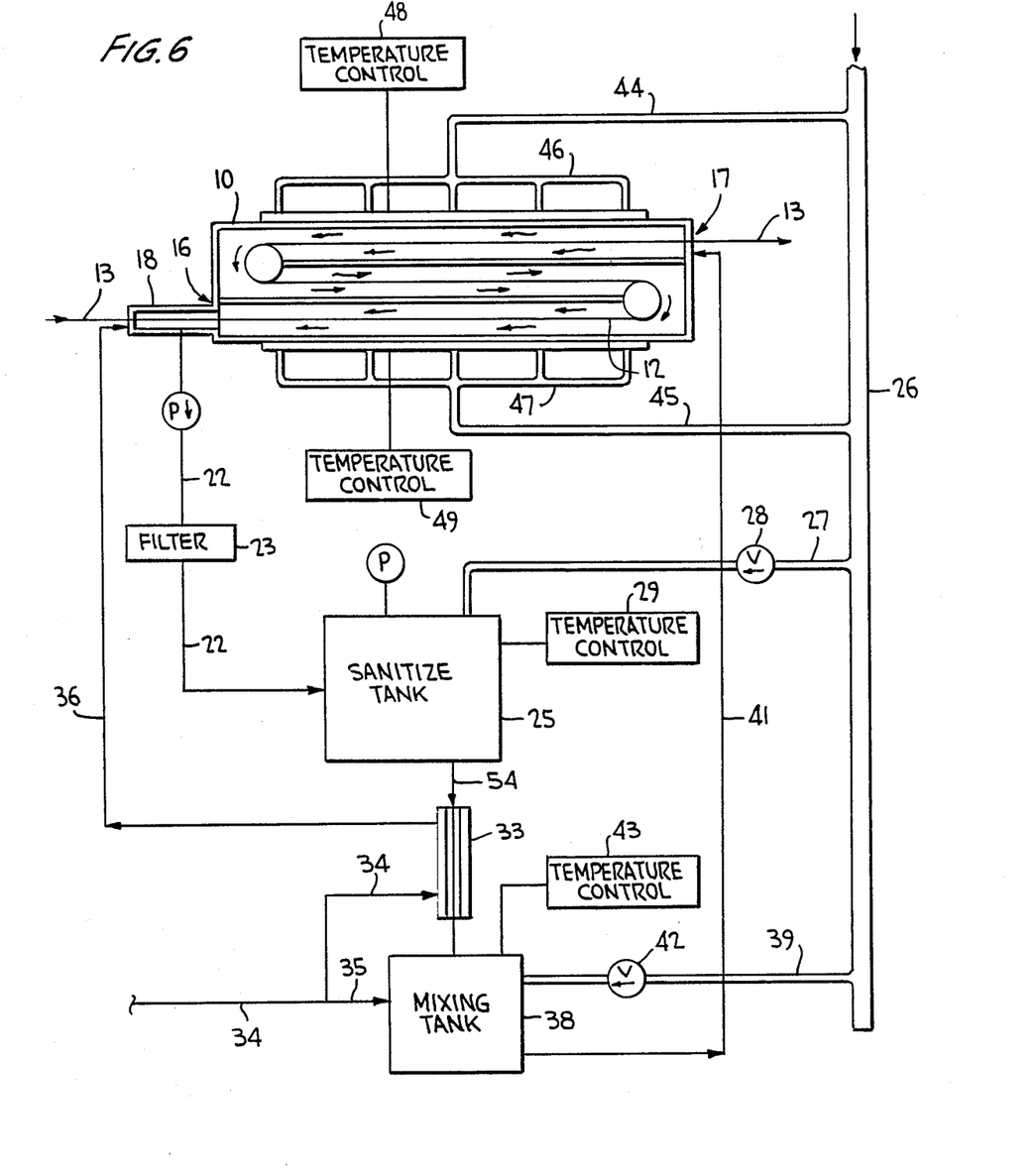

In the FIG. 6 embodiment, counterflow immersion scalding is essentially the same as aforedescribed, and like reference numerals are used to identify like elements as in FIG. 4. However, the liquid removed from the immersion tank and filtered at 23 flows at 22 into sanitize tank 25 where it is superheated to 175° F. Superheated liquid then flows at 54 through the head trough heat exchanger 33 in heat exchange relationship with the potable ground water flowing through exchanger 33 from 34. The warmed potable water flows through 36 to the head trough. And, the liquid from heat exchanger 33, at a reduced temperature, flows at 55 into the mixing tank where it is mixed with fresh potable make-up water and will be heated to the scald temperature. The recirculated and potable mix is then pumped via conduit 41 to the exit station of the scalder. This water will then counterflow against the bird movement to the entrance station of the scalder where it will be removed. This completes the counterflow loop In FIG. 6, the filtered water at scald temperature flowing from conduit 22 to the sanitize tank is superheated to 175° F. No heat exchanger is used to reduce the temperature of the superheated liquid as in FIGS. 4 and 5. The liquid flows at 54 to the head trough heat exchanger 33 and on to mixing tank 38.

Again, the make-up water at one pint per bird is 7.5 gpm. The head trough water heated from 65° F. to 90° F. is at 3 gpm. The remaining make-up water heated at the mixing tank is at 14.5 gpm. As in the exercise shown for FIG. 4, 8,249 BTU per minute is required to heat all the make-up water. The recirculated liquid after being superheated has excess BTUs above the 128° F. desired scald temperature. Thus, (8.345 lb./gal.) (175° F.−128° F.)=392.21 BTU per gallon which is taken from the recirculated liquid at the mixing tank. To determine how much liquid at 175° F. can be recirculated in the system without overheating the make-up water, 8,249 BTU to heat the make-up water divided by 392.21 BTU per gallon of superheated water to be removed yields 21.03 gallons per minute which is the rate of flow of liquid that can be recirculated.

Although this is below the desired recirculated volume of 116 gpm required to recirculate a volume equal to the scalder, the FIG. 6 arrangement has advantages over prior immersion scalding systems in that the recirculated liquid is filtered and cleaned, sanitized to remove bacteria and the make-up water is heated before being returned to the immersion tank.

The foregoing examples were given for soft-scald of chickens, although similar showings can be made for the advantages of the present system for a hard scald chicken scalder and for hard scalding turkeys.

Also, it can be shown that the BTU's required for the present system are substantially less than required for prior art systems. There are cost savings in make-up water expense compared to the cost in otherwise bringing water in and treating the affluent discharge in prior systems. By comparison, scalders using live steam injection utilize more energy to operate compared to the present system. The live steam injector scalders experience significant steam blow-by as the steam reaches the surface of the water in the scalder before it is completely dissipated in the water, and is thereby lost to the atmosphere.

In the present system the BTU's necessary to heat the make-up water will be added in the sanitize and mixing tanks. This heat will be added by heat exchange plates or by steam injection into closed tanks. No steam will escape to the atmosphere as in the steam injection scalders to heat the add water. Some steam will be added to the scalder such that there may be some steam blow-by but not nearly as much compared to live steam injection scalders The steam in the present invention is added to the immersion scalder only to replace surface loss and heat absorbed by the birds. The largest requirement for heat is to raise the temperature of the potable make-up water used in the scalding process.

From the foregoing it can be seen that many modifications and variations of the present invention are made Possible in the light of the above teachings. It is therefore to be understood that within the scope of the appended claims the invention may be practiced otherwise than as specifically described.

What is claimed is:

1. A poultry scalding system comprising, an open immersion tank adapted to contain scalding liquid at a predetermined scald temperature, conveyor means positioned above said tank for moving poultry in one direction through said tank from an entrance station to an exit station at said tank while the poultry is immersed in the liquid as the poultry hangs by the legs from said conveyor means, liquid recirculating means connected to said tank for recirculating substantially all of the liquid in a direction opposite said one direction in a given period of time during operation of said conveyor means by removing the liquid at said entrance station and returning a quantity of liquid to said tank at said exit station, means for replenishing any loss of liquid from said tank, said recirculating means including means for filtering the liquid removed at said entrance location, and means for heating the add-on liquid to said scalding temperature before being returned to said tank.

2. The system according to claim 1, wherein said heating means is coupled downstream of said filter means into said recirculating means and comprises heat exchange means and a closed vessel coupled thereto and containing liquid at a first temperature above said scalding temperature, said heat exchange means and said vessel having flow means by which filtered liquid at said scald temperature is in heat exchange relationship in said heat exchange means with the liquid at said first temperature for elevating the temperature of the filtered liquid to a second temperature between said first and said scald temperatures, and said recirculating means having a closed heated tank downstream of said heat exchanger means for pooling said second temperature liquid with said add-on liquid to said scald temperature.

3. The system according to claim 1, wherein said immersion tank has a shallow liquid filled head trough at said entrance station, said conveyor means being positioned above said trough for moving poultry in said one direction through said trough while the head only of the poultry is immersed in the trough liquid as it hangs by the legs from said conveyor means.

4. The system according to claim 3, wherein said recirculating means has a head trough heat exchanger between said heat exchange means and said heated tank and through which the add-on liquid flows to said trough at a third temperature between the temperature of the add-on liquid and the scald temperature.

5. A poultry scalding system comprising, an open immersion tank adapted to contain scalding liquid at a predetermined scald temperature, conveyor means positioned above said tank for moving poultry in one direction through said tank from an entrance station to an exit station at said tank while the poultry is immersed in the liquid as the poultry hangs by the legs from said conveyor means, a pipe circuit external to said tank for recirculating substantially all the scalding liquid in a direction opposite said one direction during operation of said conveyor means, said circuit being connected to said tank for removing the liquid at the entrance station, means for supplying unheated add-on liquid to the removed liquid to form recirculated liquid, means for heating the recirculated liquid to the scald temperature, and said circuit being connected to said tank for returning the recirculated liquid to said tank at said exit station.

6. The system according to claim 5, wherein said heating means comprises means coupled into said circuit for heating the removed liquid to a temperature above said scald temperature to form heating liquid, and means coupled into said circuit for combining the heating liquid with the add-on liquid to heat up the recirculated liquid to said scald temperature.

7. The system according to claim 6, wherein said means coupled into said circuit comprises a heat exchanger through which the removed liquid flows, a superheated liquid tank at a temperature above that of said heating liquid and in flow communication with said heat exchanger through which superheated liquid flows.

8. The system according to claim 5, wherein said immersion tank has a shallow liquid containing head trough at said entrance station, said conveying means being located above said trough for moving the poultry through the trough while immersing only the heads of the poultry in the trough liquid as the poultry hangs by the legs.

9. The system according to claim 8, further comprising a head trough heat exchanger coupled into said circuit through which the heating liquid passes and through which the add-on liquid passes in heat exchange relationship for heating the add-on liquid to a temperature below said scald temperature, said head trough heat exchanger having an exit end connected to said head trough for supplying said trough with liquid at said temperature below said scald temperature.

10. A poultry scalding process, comprising the steps of immersing poultry in an open immersion tank adapted to contain scalding liquid at a predetermined scald temperature, the immersing step being carried out by conveying the poultry in one direction through the tank from an entrance station to an exit station at said tank while the poultry hangs by the legs, recirculating substantially all the scalding liquid in a direction opposite said one direction during poultry conveying in a predetermined time interval by removing the liquid at the entrance station, supplying unheated add-on liquid to the removed liquid to form recirculated liquid, heating the recirculated liquid to the scald temperature and returning the heated recirculated liquid to said tank at said exit station.

11. The process according to claim 10, wherein said heating step comprises heating the removed liquid to a temperature above said scald temperature to form heating liquid, and combining the heating liquid with the add-on liquid to heat up the recirculated liquid to said scald temperature.

12. The process according to claim 11, wherein the step of heating the removed liquid is carried out by passing the removed liquid in heat exchange relationship with superheated liquid heated to a temperature above that of said heating liquid.

13. The process according to claim 10, further comprising the step of providing said tank with a shallow liquid containing head trough at said entrance station, and conveying the poultry in said one direction through said trough while immersing the head only of the poultry in the trough liquid as the poultry hangs by the legs.

14. The process according to claim 11, further comprising the step of heating the removed liquid by passing the removed liquid in heat exchange relationship with superheated liquid heated to a temperature above that of said heating liquid.

15. The process according to claim 14, further comprising the step of passing the heating liquid in heat exchange relationship with the add-on liquid to form head trough liquid at a temperature below said scald temperature, and supplying said head trough with said head trough liquid.

* * * * *